(12) United States Patent
Wang et al.

(10) Patent No.: US 10,164,512 B2
(45) Date of Patent: Dec. 25, 2018

(54) VIBRATION MOTOR

(71) Applicants: Hongxing Wang, Shenzhen (CN); Lubin Mao, Shenzhen (CN)

(72) Inventors: Hongxing Wang, Shenzhen (CN); Lubin Mao, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 346 days.

(21) Appl. No.: 15/283,548

(22) Filed: Oct. 3, 2016

(65) Prior Publication Data

US 2017/0117794 A1 Apr. 27, 2017

(30) Foreign Application Priority Data

Oct. 27, 2015 (CN) .......................... 2015 1 0707600

(51) Int. Cl.
*H02K 33/00* (2006.01)
*H02K 99/00* (2014.01)
*H02K 33/16* (2006.01)
*H02K 33/18* (2006.01)
*H02K 16/02* (2006.01)

(52) U.S. Cl.
CPC ............. *H02K 99/20* (2016.11); *H02K 33/16* (2013.01); *H02K 33/18* (2013.01); *H02K 16/02* (2013.01)

(58) Field of Classification Search
CPC .......................................... H02K 33/00–33/18
See application file for complete search history.

(56) References Cited

U.S. PATENT DOCUMENTS 8,461,969 B2 * 6/2013 An .......................... H02K 3/06
310/320

* cited by examiner

*Primary Examiner* — Ramon M Barrera
(74) *Attorney, Agent, or Firm* — Na Xu; IPro, PLLC

(57) ABSTRACT

A vibration motor is provided in the present disclosure. The vibration motor includes a frame, vibrating assemblies and elastic connectors. The elastic connectors comprise a first elastic connector and a second elastic connector. The vibrating assemblies comprise a first vibration system and a second vibration system disposed at two sides of the frame respectively. A portion of the first elastic connector is connected with the first vibration system and another portion of the first elastic connector is connected with one side of the frame, and a portion of the second elastic connector is connected with the second vibration system and another portion of the second elastic connector is connected with the other side of the frame. The first vibration system comprises a coil, the second vibration system comprises a magnetic circuit system with a magnetic gap, at least part of the coil is disposed in the magnetic gap.

14 Claims, 3 Drawing Sheets

VIBRATION MOTOR

FIELD OF THE DISCLOSURE

The present invention relates to the field of motor technology, and in particular, relates to a vibration motor for portable consumer electronic product.

BACKGROUND

With the development of electronic technology, portable consumer electronic products are becoming more and more popular, such as mobile phones, handheld game consoles, navigation devices or handheld multimedia entertainment equipment etc. Such products generally employ vibration motors to give system feedbacks, such as mobile phone incoming call prompt, information prompt, navigation cues, vibrating feedback of the game console and the like.

The vertical vibration motors do not generate vibrations based on the rotation principle of motors. Instead, they generate resonance by generating electromagnetic force periodically according to resonance frequency, so as to generate vibration.

The vibration motor in related art vibrates at a single frequency when working. However, when it is driven by a driving frequency different from its resonance frequency, it cannot achieve resonance state.

Therefore, it is desired to provide a new vibration motor which can overcome the aforesaid problems.

BRIEF DESCRIPTION OF THE DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and the embodiment thereof.

Figure 1:
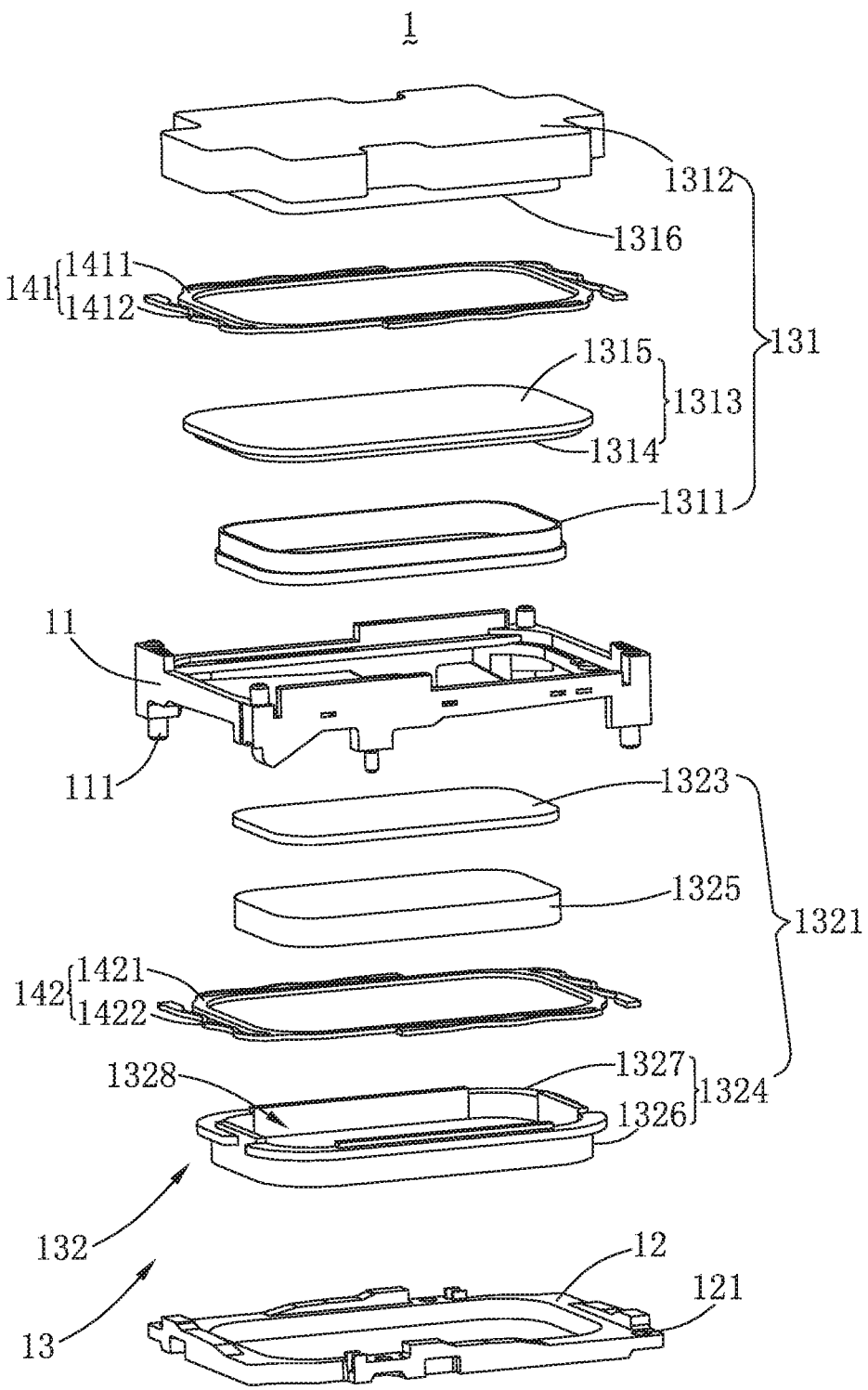
FIG. 1 is an exploded perspective view of a vibration motor according to the present invention.
Figure 2:
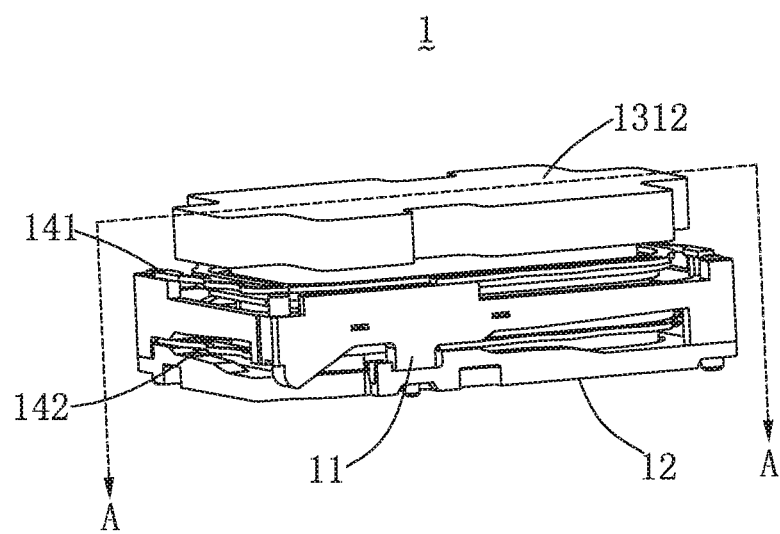
FIG. 2 is a perspective view of the vibration motor shown in FIG. 1.
Figure 3:
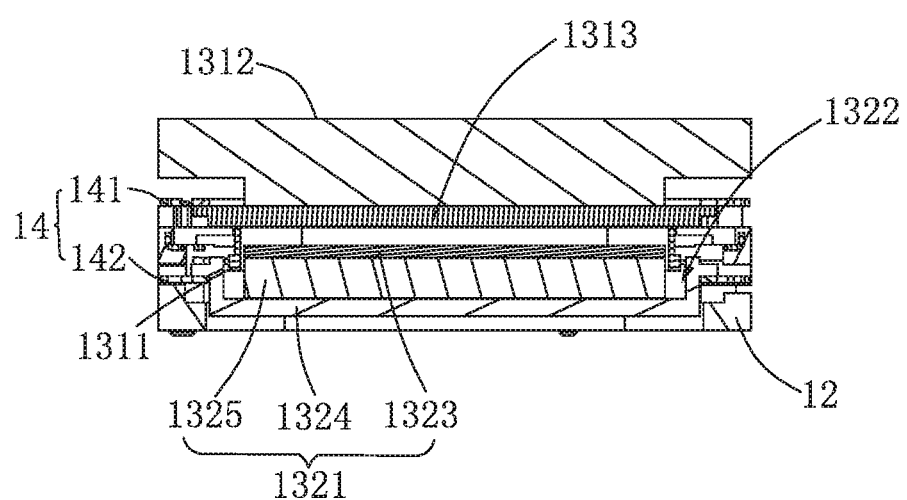
FIG. 3 is a sectional view showing the vibration motor shown in FIG. 2 along A-A.

Referring to FIGS. 1-3, a vibration motor 10 comprises a frame 11, a lower cover 12, vibrating assemblies 13 and elastic connectors 14 which can provide resilient restoring forces for the vibrating assemblies 13.

The frame 11 is formed with connecting posts 111 and the lower cover 12 has connecting holes 121. The connecting posts 1 and the connecting holes 121 are corresponding to each other in position, number and dimension. The frame 11 can be secured onto the lower cover 12 by inserting the connecting posts 111 into the connecting holes 121 of the lower cover 12. The frame 11 and the lower cover 12 can cooperate to enclose a receiving space. In this embodiment, both of the connecting posts 111 and the connecting holes 121 are four in number.

The vibrating assemblies 13 comprises a first vibration system 131 and a second vibration system 132 disposed at two sides of the frame 11 respectively. As can be seen from the drawings, the first vibration system 131 and the second vibration system 132 are disposed at the upper side and the lower side of the frame 11 respectively. However, it should be appreciated that the first vibration system 131 and the second vibration system 132 can be disposed at the left side and the right side of the frame 11.

In this embodiment, the first vibration system 131 comprises a coil 1311, a mass 1312 and a connecting plate 1313. The coil 1311 can be disposed near the second vibration system 132. At least part of the coil 1311 is disposed within the magnetic gap of the second vibration system 132. The mass 1312 is disposed at a side of the coil 1311 away from the second vibration system 132. The surface of the mass 1312 facing the second vibration system 132 is provided with a boss 1316. A connecting plate 1313 is disposed between the coil 1311 and the mass 1312, and is abutted against the boss 1316 of the mass 1312. The connecting plate 1313 comprises a body 1314 and a connecting sheet 1315 stacked in sequence. The body 1314 is disposed at the side near the coil 1311. The body 1314 and the connecting sheet 1315 are the same in shape, but the cross-sectional area of the body 1314 is smaller than the cross-sectional area of the connecting sheet 1315. The body 1314 and the connecting sheet 1315 can be formed integrally, or can be separate structures. The coil 1311 is secured on the surface of the body 1314 facing the second vibration system 132.

The second vibration system 132 comprises a magnetic circuit system 1321. The magnetic circuit system 1321 comprises a magnetic bowl 1324, a magnet steel block 1325 received in the magnetic bowl 1324 and a pole core 1323 attached on the surface of the magnet steel block 1325. The magnetic bowl 1324 and the magnet steel block 1325 are spaced apart from each other and form a magnetic gap 1322. The lower end of the coil 1311 of the first vibration system 131 is disposed in the magnetic gap 1322. The magnetic bowl 1324 is secured in the receiving space enclosed by the frame 11 and the lower cover 12. The magnetic bowl 1324 comprises a magnetic bowl body 1326 and step portion(s) 1327 extending and bending from the upper end face of the magnetic bowl body 1326.

The elastic connectors 14 comprise a first elastic connector 141 and a second elastic connector 142.

Specifically, the first elastic connector 14 is disposed between the mass 1312 and the connecting plate 1313. The first elastic connector 14 comprises a first body portion 1411 connected with the connecting plate 1313 and a plurality of first elastic support feet 1412 connected with the frame 11. The first body portion 1411 is connected with the outer edge of the connecting sheet 1315 of the connecting plate 1313. Preferably, the first body portion 1411 is annular, and there are four first elastic support feet 1412 disposed central symmetrically with respect to the first body portion 1411. The boss 1316 of the mass 1312 can pass through the first body portion 1411 of the first elastic connector 141 to abut against the connecting plate 1313.

The second elastic connector 142 is disposed between the magnetic bowl 1324 and the frame 11, and its structure is the same as the first elastic connector 141. The second elastic connector 142 comprises a second body portion 1421 connected with the step portion(s) 1327 of the magnetic bowl 1324 and a plurality of second elastic support feet 1422 connected with the frame 11. The second body portion 1421 is stacked on the step portion(s) 1327. Preferably, the second body portion 1421 is annular, and there are four second elastic support feet 1422 disposed central symmetrically with respect to the second body portion 1421.

When the coil 1311 is energized, the coil and the magnetic circuit system 1321 can generate a driving force to drive the first vibration system 131 and the second vibration system 132 to vibrate along the vertical direction in the drawing. For example, if the resonance frequency of the first vibration system 131 is f01 and the resonance frequency of the second vibration system 132 is f02, when the current signal frequency is equal to the resonance frequency f01 of the first vibration system 131, the first vibration system 131 reaches its resonance state, but at the same time the second vibration system 132 does not reach its resonance state and therefore vibrates weakly; however, when the current signal frequency is equal to the resonance frequency f02 of the second vibration system 132, the second vibration system 132 reaches its resonance state, but at this time the first vibration system 132 does not reach its resonance state and therefore is vibrates weakly.

When the vibration motor 10 described above is provided with different driving frequencies, the first vibration system 131 and the second vibration system 132 can produce different vibrating senses, which can improve the performance of the vibration motor 10 and the user's experience.

Comparing to the prior art, the vibration motor provided by the present invention has a first vibration system and a second vibration system that can vibrate in the same direction. When different driving frequencies are given to the vibration motor, the first vibration system and the second vibration system can produce different vibrating senses which can improve the performance of the vibration motor and the user's experience It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibration motor, comprising:
   a frame;
   vibrating assemblies comprising a first vibration system and a second vibration system disposed at two sides of the frame respectively; and
   elastic connectors providing resilient restoring forces to the vibrating assemblies, and comprising a first elastic connector and a second elastic connector;
   wherein a portion of the first elastic connector is connected with the first vibration system and another portion of the first elastic connector is connected with one side of the frame, a portion of the second elastic connector is connected with the second vibration system and another portion of the second elastic connector is connected with the other side of the frame, the first vibration system comprises a coil, the second vibration system comprises a magnetic circuit system with a magnetic gap, at least part of the coil is disposed in the magnetic gap, the driving force generated by the coil and the magnetic circuit system will drive the first vibration system and/or the second vibration system to vibrate in the same direction.

2. The vibration motor of claim 1, wherein the first elastic connector and the second elastic connecter is the same in structure.

3. The vibration motor of claim 1, wherein the first vibration system further comprises a mass, wherein the mass is disposed at the side of the coil away from the second vibration system.

4. The vibration motor of claim 3, wherein the surface of the mass facing the coil is provided with a boss.

5. The vibration motor of claim 4, wherein the first vibration system further comprises a connecting plate disposed between the mass and the coil, wherein the connecting plate is abutted against the boss; the boss is secured on the surface of the connecting plate facing the second vibration system; a portion of the first elastic connector is connected with the connecting plate and another portion of the first elastic connector is connected with the frame.

6. The vibration motor of claim 5, wherein the connecting plate comprise a body and a connecting sheet stacked in sequence, the body is disposed near the second vibration system, and the coil is secured on the surface of the body facing the second vibration system.

7. The vibration motor of claim 6, wherein the body and the connecting sheet are formed integrally.

8. The vibration motor of claim 6, wherein the body and the connecting sheet are the same in shape, but the cross-sectional area of the body is smaller than the cross-sectional area of the connecting sheet.

9. The vibration motor of claim 5, wherein the first elastic connector comprises a first body portion connected with the connecting plate and a plurality of first elastic support feet connected with the frame.

10. The vibration motor of claim 9, wherein the first body portion is annular, there are four first elastic support feet disposed central symmetrically with respect to the first body portion.

11. The vibration motor of claim 10, wherein the boss of the mass passes through the first body portion of the first elastic connector to abut against the connecting plate.

12. The vibration motor of claim 1, wherein the magnetic circuit system further comprises a magnetic bowl connected with the second elastic connector, and a magnet steel block received in the magnetic bowl, the magnetic bowl and the magnet steel block are spaced apart and form the magnetic gap.

13. The vibration motor of claim 12, wherein the magnetic circuit system further comprises a pole core attached on the magnet steel block.

14. The vibration motor of claim 13, wherein the vibration motor further comprises a lower cover for securing the magnetic bowl, the lower cover can cooperate with the frame to enclose a receiving space, and the magnetic bowl is secured in the receiving space.

* * * * *